(12) United States Patent
Gere

(10) Patent No.: US 8,497,897 B2
(45) Date of Patent: Jul. 30, 2013

(54) IMAGE CAPTURE USING LUMINANCE AND CHROMINANCE SENSORS

(75) Inventor: David S. Gere, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 366 days.

(21) Appl. No.: 12/857,903

(22) Filed: Aug. 17, 2010

(65) Prior Publication Data

US 2012/0044328 A1     Feb. 23, 2012

(51) Int. Cl.
*H04N 13/02* (2006.01)
*H04N 7/18* (2006.01)

(52) U.S. Cl.
USPC .............................................. 348/48; 348/154

(58) Field of Classification Search
USPC ......................................................... 348/48
See application file for complete search history.

(56) References Cited

U.S. PATENT DOCUMENTS

| | | | |
|---|---|---|---|
| 3,363,104 A | 1/1968 | Waite et al. |
| 3,761,947 A | 9/1973 | Volkmann et al. |
| 4,620,222 A | 10/1986 | Baba et al. |
| 5,272,473 A | 12/1993 | Thompson et al. |
| 5,274,494 A | 12/1993 | Rafanelli et al. |
| 5,337,081 A | 8/1994 | Kamiya et al. |
| 5,757,423 A | 5/1998 | Tanaka et al. |
| 6,282,655 B1 | 8/2001 | Given |
| 6,310,662 B1 | 10/2001 | Sunakawa et al. |
| 6,339,429 B1 | 1/2002 | Schug |
| 6,389,153 B1 | 5/2002 | Imai et al. |
| 6,416,186 B1 | 7/2002 | Nakamura |
| 6,516,151 B2 | 2/2003 | Pilu |
| 6,560,711 B1 | 5/2003 | Given et al. |
| 6,561,654 B2 | 5/2003 | Mukawa et al. |
| 6,636,292 B2 | 10/2003 | Roddy et al. |
| 6,807,010 B2 | 10/2004 | Kowarz |
| 6,862,022 B2 | 3/2005 | Slupe |
| 6,877,863 B2 | 4/2005 | Wood et al. |
| 6,903,880 B2 | 6/2005 | Beatson et al. |
| 6,921,172 B2 | 7/2005 | Ulichney et al. |
| 6,924,909 B2 | 8/2005 | Lee et al. |

(Continued)

FOREIGN PATENT DOCUMENTS

| | | |
|---|---|---|
| EP | 167314 | 1/1986 |
| EP | 2053844 | 4/2009 |

(Continued)

OTHER PUBLICATIONS

Adrian Stern et al., Three-Dimensional Image Sensing, Visualization, and Processing Using Integral Imaging, 2006, IEEE, pp. 1-17.*

(Continued)

*Primary Examiner* — Sath V Perungavoor
*Assistant Examiner* — Peter D Le
(74) *Attorney, Agent, or Firm* — Dorsey & Whitney LLP

(57) ABSTRACT

Methods and apparatuses disclosed herein relate to image sensing devices. One embodiment may take the form of an image sensing device that includes a first image sensor for capturing a luminance image, a second image sensor for capturing a first chrominance, and a third image sensor for capturing a second chrominance image. The image sensing device may further include an image processing module for combining the luminance image captured by the first image sensor, the first chrominance image captured by the second image sensor, and the second chrominance image captured by the third image sensor, to form a composite image.

18 Claims, 4 Drawing Sheets

U.S. PATENT DOCUMENTS

| | | | |
|---|---|---|---|
| 6,930,669 B2 | 8/2005 | Weiner et al. | |
| 6,931,601 B2 | 8/2005 | Vronay et al. | |
| 6,970,080 B1 | 11/2005 | Crouch et al. | |
| 7,028,269 B1 | 4/2006 | Cohen-Solal et al. | |
| 7,058,234 B2 | 6/2006 | Gindele et al. | |
| 7,079,707 B2 | 7/2006 | Baron | |
| 7,123,292 B1 * | 10/2006 | Seeger et al. | 348/218.1 |
| 7,123,298 B2 | 10/2006 | Schroeder et al. | |
| 7,307,709 B2 | 12/2007 | Lin et al. | |
| 7,352,913 B2 | 4/2008 | Karuta et al. | |
| 7,370,336 B2 | 5/2008 | Husain et al. | |
| 7,413,311 B2 | 8/2008 | Govorkov et al. | |
| 7,453,510 B2 | 11/2008 | Kolehmainen et al. | |
| 7,460,179 B2 | 12/2008 | Pate et al. | |
| 7,483,065 B2 * | 1/2009 | Gruhlke et al. | 348/277 |
| 7,512,262 B2 | 3/2009 | Criminisi et al. | |
| 7,551,771 B2 | 6/2009 | England | |
| 7,561,731 B2 * | 7/2009 | Wallace et al. | 382/154 |
| 7,570,881 B2 | 8/2009 | Perala et al. | |
| 7,590,335 B2 | 9/2009 | Kobayashi et al. | |
| 7,590,992 B2 | 9/2009 | Koplar et al. | |
| 7,598,980 B2 | 10/2009 | Imai et al. | |
| 7,613,389 B2 | 11/2009 | Suzuki et al. | |
| 7,629,897 B2 | 12/2009 | Koljonen | |
| 7,641,348 B2 | 1/2010 | Yin et al. | |
| 7,653,304 B2 | 1/2010 | Nozaki et al. | |
| 7,658,498 B2 | 2/2010 | Anson | |
| 7,834,846 B1 | 11/2010 | Bell | |
| 7,869,204 B2 | 1/2011 | Bair et al. | |
| 7,901,084 B2 | 3/2011 | Willey et al. | |
| 7,964,835 B2 | 6/2011 | Olsen et al. | |
| 8,044,880 B2 | 10/2011 | Nakamura et al. | |
| 2002/0025075 A1 * | 2/2002 | Jeong et al. | 382/217 |
| 2003/0038927 A1 | 2/2003 | Alden | |
| 2003/0086013 A1 | 5/2003 | Aratani | |
| 2003/0117343 A1 | 6/2003 | King | |
| 2004/0193413 A1 | 9/2004 | Wilson et al. | |
| 2005/0132408 A1 | 6/2005 | Dahley et al. | |
| 2005/0168583 A1 | 8/2005 | Thomason | |
| 2005/0182962 A1 | 8/2005 | Given et al. | |
| 2005/0280786 A1 | 12/2005 | Moiroux et al. | |
| 2006/0140452 A1 | 6/2006 | Raynor et al. | |
| 2006/0197843 A1 | 9/2006 | Yoshimatsu | |
| 2007/0027580 A1 | 2/2007 | Ligtenberg et al. | |
| 2007/0177279 A1 | 8/2007 | Cho et al. | |
| 2007/0236485 A1 | 10/2007 | Trepte | |
| 2007/0300312 A1 | 12/2007 | Chitsaz et al. | |
| 2008/0062164 A1 | 3/2008 | Bassi et al. | |
| 2008/0131107 A1 | 6/2008 | Ueno | |
| 2008/0158362 A1 | 7/2008 | Butterworth | |
| 2008/0191864 A1 | 8/2008 | Wolfson | |
| 2009/0008683 A1 | 1/2009 | Nishizawa | |
| 2009/0027337 A1 | 1/2009 | Hildreth | |
| 2009/0051797 A1 | 2/2009 | Yao | |
| 2009/0115915 A1 | 5/2009 | Steinberg et al. | |
| 2009/0221368 A1 | 9/2009 | Yen et al. | |
| 2009/0262306 A1 | 10/2009 | Quinn et al. | |
| 2009/0262343 A1 | 10/2009 | Archibald | |
| 2009/0273679 A1 | 11/2009 | Gere et al. | |
| 2009/0309826 A1 | 12/2009 | Jung et al. | |
| 2010/0060803 A1 | 3/2010 | Slack et al. | |
| 2010/0061659 A1 | 3/2010 | Slack et al. | |
| 2010/0073499 A1 | 3/2010 | Gere | |
| 2010/0079426 A1 | 4/2010 | Pance et al. | |
| 2010/0079468 A1 | 4/2010 | Pance et al. | |
| 2010/0079653 A1 | 4/2010 | Pance | |
| 2010/0079884 A1 | 4/2010 | Gere et al. | |
| 2010/0083188 A1 | 4/2010 | Pance et al. | |
| 2010/0103172 A1 | 4/2010 | Purdy | |
| 2011/0074931 A1 | 3/2011 | Bilbrey et al. | |
| 2011/0075055 A1 | 3/2011 | Bilbrey | |
| 2011/0115964 A1 | 5/2011 | Gere | |
| 2011/0149094 A1 | 6/2011 | Chen et al. | |
| 2012/0076363 A1 | 3/2012 | Kessler et al. | |

FOREIGN PATENT DOCUMENTS

| | | |
|---|---|---|
| JP | 2002354493 | 12/2002 |
| WO | WO 93/11631 | 6/1993 |
| WO | WO2007/100057 | 9/2007 |
| WO | WO2009/001512 | 12/2008 |

OTHER PUBLICATIONS

Bob Thomas, An Introduction to Photo Stitching, 2007, Eastern Suburbs Photographic Society, pp. 1-12.*

Yao Wang, Video Processing and Communications, 2001, Prentice-Hall, Chap 1.*

Author Unknown, "YCbCr," http://en.wikipedia.org/wiki/Y%27CbCr, 4 pages, at least as early as Jun. 17, 2010.

Koschan et al., "Finding Objects in a 3D Environment by Combining Distance Measurement and Color Indexing," IEEE, vol. 1, pp. 858-861, Oct. 2001.

Sokolova et al., "Experiments in Stereo Vision," Computer Science 570, Final Project, http://disparity.wikidot.com/, 14 pages, at least as early as Jun. 16, 2010.

International Search Report, PCT/US2010/054667, 4 pages, Feb. 4, 2011.

International Search Report, PCT/US2010/046203, 3 pages, Nov. 5, 2010.

* cited by examiner

IMAGE CAPTURE USING LUMINANCE AND CHROMINANCE SENSORS

BACKGROUND

I. Technical Field

The disclosed embodiments relate generally to image sensing devices and, more particularly, to an image sensing device for capturing images having separate luminance and chrominance sensors.

II. Background Discussion

Certain image capture devices, such as digital cameras and video recorders, can take video or still photographs, or both, by digitally recording images using an electronic image sensor. The continuing decrease in manufacturing costs of electronic imaging devices, combined with increasing functionality and enhanced user interfaces, have led to increased and widespread usage. Digital cameras and/or video cameras are found not only as freestanding devices, but are also incorporated into other electronic devices. For example, such devices may be incorporated into computers, mobile phones, handheld computing devices, and the like. These devices may also be used as computing peripherals to permit image capture, video conferencing, video chatting and so on.

Most electronic imaging devices employ a photosensor made of a grid of light-sensitive pixels. These pixels may measure light intensity (or luminance), as well as particular colors of light impacting them. The electronic representation of the particular colors of light may be processed to derive the chrominance component of the image, or the luminance portion of the image, or both. Typically, the luminance portion of a color image may have a greater influence on the overall image resolution than the chrominance portion. This effect can be at least partially attributed to the structure of the human eye, which includes a higher density of rods for sensing luminance than cones for sensing color.

While an image sensing device that emphasizes luminance over chrominance generally does not perceptibly compromise the resolution of the produced image, color information can be lost if the luminance and chrominance sensors are connected to separate optical lens trains, and a "blind" region of the luminance sensor is offset from the "blind" region of the chrominance sensor. One example of such a blind region can occur due to a foreground object occluding a background object. Further, the same foreground object may create the blind region for both the chrominance and luminance sensors, or the chrominance blind region created by one object may not completely overlap the luminance blind region created by a second object. In such situations, color information may be lost for the "blind" regions of the chrominance sensor, thereby compromising the resolution of the composite color image.

SUMMARY

Embodiments described herein relate to systems, apparatuses and methods for capturing an image using one or more dedicated image sensors to capture luminance and chrominance portions of an image. The image sensors may include one or more luminance sensors and one or more chrominance sensors to capture images of a certain resolution, regardless of the position of objects in the image. In one embodiment, a luminance sensor may be positioned between two chrominance sensors. The fields of view of the chrominance sensors may be offset such that their potential blind regions do not overlap. Accordingly, chrominance information may be obtained for each pixel of the image sensor.

One embodiment may take the form of an image sensing device that includes a first image sensor for capturing a luminance image, a second image sensor for capturing a first chrominance, and a third image sensor for capturing a second chrominance image. The image sensing device may further include an image processing module for combining the luminance image captured by the first image sensor, the first chrominance image captured by the second image sensor, and the second chrominance image captured by the third image sensor, to form a composite image.

Other embodiments may take the form of an image sensing device that includes a first image sensor for capturing a luminance image, a second image sensor for capturing a first chrominance image, and a third image sensor for capturing a second chrominance image. The first image sensor may have a first blind region due to a near field object. The second image sensor may have a second blind region due to the near field object. The third image sensor may have a third blind region due to the near field object. The image sensing device may further include an image processing module for combining the luminance image captured by the first image sensor, the first chrominance image, and the second chrominance image, to form a composite image. The second blind region of the second image sensor may be offset from the third blind region of the third image sensor.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Other features, details, utilities, and advantages will be apparent from the following more particular written description of various embodiments, as further illustrated in the accompanying drawings and defined in the appended claims.

BRIEF DESCRIPTION OF THE DRAWINGS

The use of the same reference numerals in different drawings indicates similar or identical items.

DETAILED DESCRIPTION

Embodiments described herein relate to systems, apparatuses and methods for capturing an image using a dedicated image sensor to capture luminance and chrominance portions of an image. The image sensor may include one or more luminance sensors and one or more chrominance sensors to capture images of a certain resolution, regardless of the position of objects in the image. In one embodiment, the luminance sensor may be positioned between the two chrominance sensors. The fields of view of the chrominance sensors may be offset such that their potential blind regions do not overlap. The blind regions may be caused by an obscuration that partially or fully blocks or obscures other objects that would otherwise be captured by the sensors. Accordingly, chrominance information may be obtained for each pixel of the image sensor.

In the following discussion of illustrative embodiments, the term "image sensing device" includes, without limitation, any electronic device that can capture still or moving images. The image sensing device may utilize analog or digital sensors, or a combination thereof, for capturing the image. In some embodiments, the image sensing device may be configured to convert or facilitate converting the captured image into digital image data. The image sensing device may be hosted in various electronic devices including, but not limited to, digital cameras, personal computers, personal digital assistants (PDAs), mobile telephones, or any other devices that can be configured to process image data.

Figure 1:
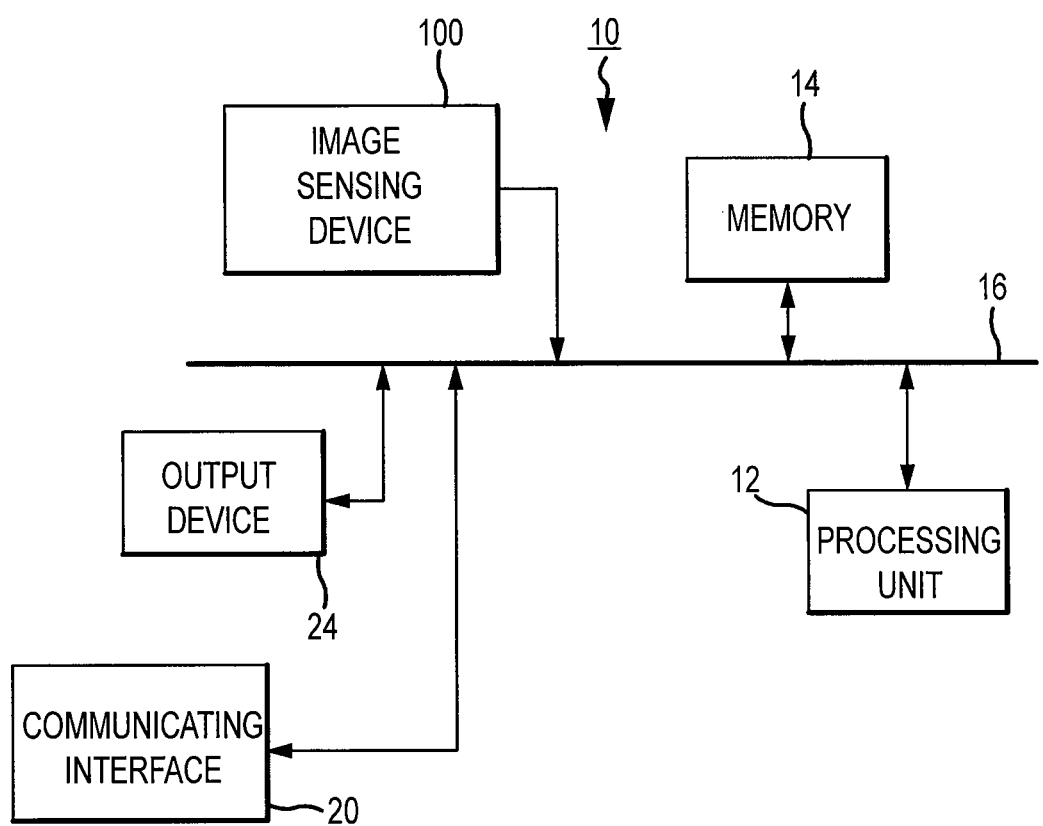
FIG. 1 is a functional block diagram that illustrates certain components of a system including one embodiment of an image sensing device.

FIG. 1 is a functional block diagram that illustrates certain components of one embodiment of an electronic device 10 that includes an example image sensing device 100. The electronic device 10 may include a processing unit 12, a memory 14, a communication interface 20, image sensing device 100, an output device 24, and a communication path 16. The communication path 16 (which can be a digital bus) may couple two or more system components including, but not limited to, memory 14 and processing unit 12. Other embodiments may include more or fewer components.

As shown in FIG. 1, the image sensing device 100 may be configured to receive incoming light and convert it to one or more image signals. The image signals may be digital signals, analog signals, or both. In one embodiment, the image sensing device 100 may transmit the image signals via the communication path 16 to the memory 14, which may store the image signals received from the image sensing device 100 before or after conveying the signals to the processing unit 12. Alternatively, the image signals may be transmitted from the image sensing device 100 to the processing unit 12, bypassing the memory 14. In either case, the processing unit 12 may use the image signals to construct a full-color image. In one embodiment, the color image may be a digital image that includes color information for each pixel of the image. As part of this process, the processing unit 12 may adjust the color values of the image data or otherwise manipulate the image data. The final full-color image may be outputted to an output device 24 either integrated into or outside of the imaging device, or may be stored in memory 14. Likewise, the final image may be made available for printing or storage either within or outside of the image sensing device 100.

The memory 14 may tangibly embody one or more programs, functions, and/or instructions that can cause one or more components of electronic device 10 (e.g., image sensing device component 100) to operate in a predefined manner as described herein. The memory 14 may include removable or fixed, volatile or non-volatile, or permanent or re-writable computer storage media. The memory 14 can be any available medium that can be accessed by a general purpose or special purpose computing or image processing device. By way of example, and not limitation, such a computer readable medium can include flash memory, random access memory, read only memory, electrically erasable programmable read only memory, optical disk storage, magnetic storage, or any other medium that can be used to store digital information.

In one embodiment, the processing unit 12 (which may be dedicated to image processing or may encompass other functions) may be configured to convert the image signals to digital data. The processing unit 12 can be any of various commercially available processors, including, but not limited to, a microprocessor, central processing unit, and so on, and can include multiple processors and/or co-processors. Other embodiments may include firmware or software configured to perform the functions of the described processing unit. In some embodiments, a communication interface 20 may facilitate data exchange between the electronic device 10 and another device, such as a host computer or a server.

In some embodiments, the electronic device 10 may further include an output device 24 configured to receive the image signals from the image sensing device 100 and display the image signals for viewing. The output device 24 may be any type of component that is capable of displaying image signals, including, but not limited to, a liquid crystal display, a light-emitting diode display, a plasma display, organic light-emitting diode display, and so on. In other embodiments, the output device 24 may not be resident in the electronic device 10, but may be a separate component that may be connected to the electronic device 10 to receive the image signals, such as a monitor, television, projector, and so on.

Figure 2:
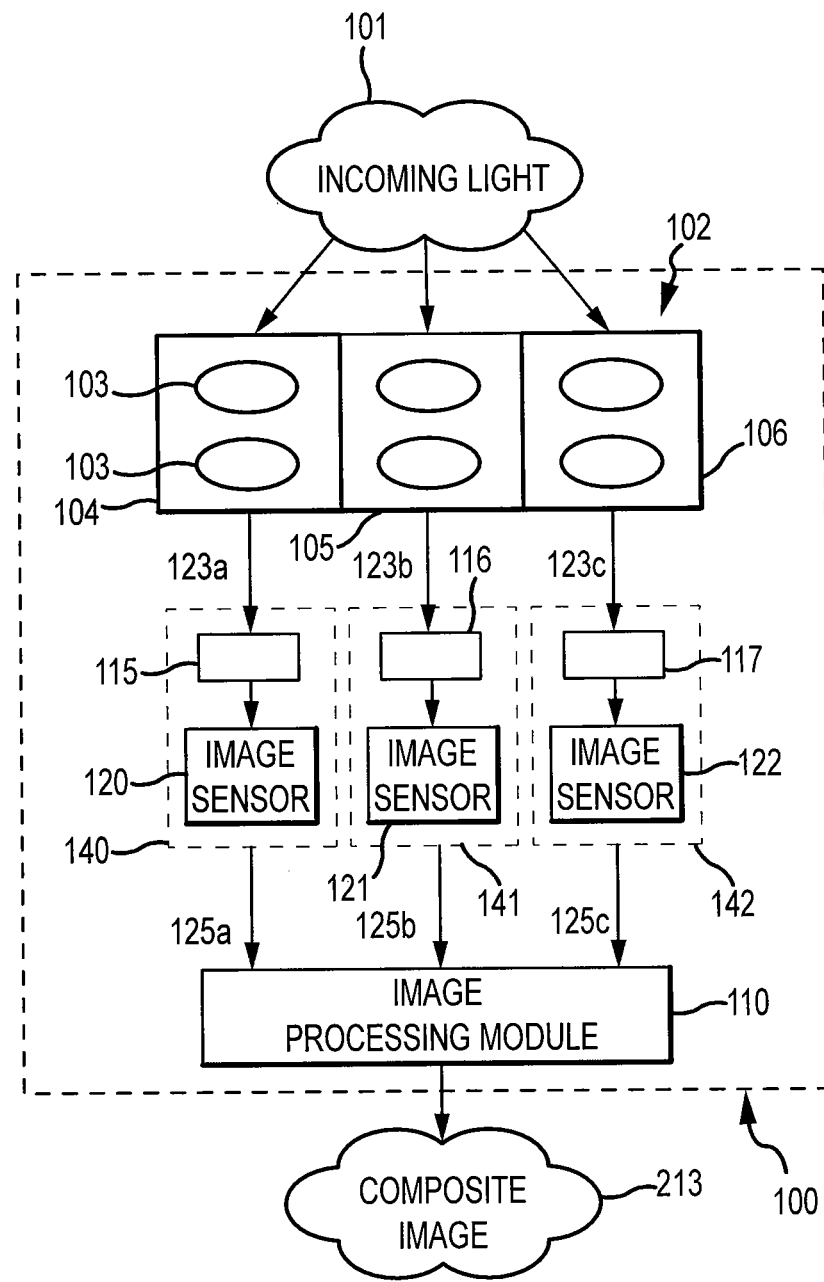
FIG. 2 is a functional block diagram of the embodiment of the image sensing device shown in FIG. 1.

FIG. 2 is a functional block diagram of one embodiment of an image sensing device 100 for capturing and storing image data. In one embodiment, the image sensing device 100 may be a component within an electronic device 10, as shown in FIG. 1. However, in other embodiments, the image sensing device 100 may be a component within other types of electronic devices that may include additional or fewer components than the device 10 shown in FIG. 1. For example, the image sensing device 100 may be employed in a standalone digital camera, a media player, a mobile phone, and so on and so forth.

As shown in FIG. 2, the image sensing device 100 may include a lens assembly 102, a first chrominance sensor 140, a luminance sensor 141, a second chrominance sensor 142, and an image processing module 110. In one embodiment, the lens assembly 102 may include three parallel lens trains 104, 105, 106. Each lens train 104, 105, 106 may have one or more optically aligned lens elements 103. In one embodiment, the parallel lens trains 104, 105, 106 may be configured to receive incoming light 101 and refract the light 123a, 123b, 123c to the luminance sensor 141 and the first and second chrominance sensors 140, 142. The lens trains 104, 105, 106 may each be configured to transmit light to an associated luminance or chrominance sensor 140, 141, 142. The luminance sensor 141 may be configured to capture a luminance component of incoming light passed by its respective parallel lens train 105. Additionally, each of the chrominance sensors 140, 142 may be configured to capture color data relating to incoming light passed by its respective parallel lens train 104, 106. In one embodiment, the chrominance sensors 140, 142 may sense the R (Red), G (Green), and B (Blue) components of an image and process these components to derive chrominance information.

In one embodiment, the lens assembly 102 may include a lens block with one or more separate lens elements 103 for each parallel lens train 104, 105, 106. According to some embodiments, each lens element 103 of the lens assembly 102 may be an aspheric lens and/or may be molded from the same molding cavity as the other corresponding lens element 103 in the opposite lens train. In addition, the molded lenses in the corresponding positions of the various parallel lens trains 104, 105, 106 may be formed from the same mold cavity. This may be useful in minimizing generated image differences, such as geometric differences and radial light fall-off, when each lens train receives the same incoming light. However, in other embodiments, the lens elements may not be molded from the same cavity. For example, the lens elements may be manufactured using multi-cavity molding tools. In other embodiments, the lenses 103 within a particular lens train may vary from one another, or the lens elements 103 may differ among lens trains. For example, one lens element may be configured with a larger aperture opening than the corresponding element in a different lens train, in order to transmit a higher intensity of light to one sensor.

The first chrominance sensor 140 may include a first filter 115 and a first image sensor 120 associated with the first filter 115. The luminance sensor 141 may have a second filter 116 and a second image sensor 121 associated with the second filter 116. The second chrominance sensor 142 may have a third filter 117, and a third image sensor 122 associated with the third filter 117. In one embodiment, the luminance sensor 141 and two chrominance sensors 140, 142 may be separate integrated circuits. However, in other embodiments, the luminance and chrominance sensors may be formed on the same circuit and/or formed on a single board or other element.

As shown in FIG. 2, the filters 115, 116, 117 may be positioned between the first, second, and third image sensors 120, 121, 122 and an object, such that light reflected off the object passes through a filter 115, 116, 117 and impacts a corresponding image sensor 120, 121, 122. The image sensors 120, 121, 122 may be any electronic sensor capable of detecting various wavelengths of light, such as those commonly used in digital cameras, digital video cameras, mobile telephones and personal digital assistants, web cameras, and so on and so forth.

In one embodiment, the first, second, and third image sensors 120, 121, 122 may be formed from an array of color-sensitive pixels. That is, each pixel of the image sensors 120, 121, 122 may detect at least one of the various wavelengths that make up visible light. The signal generated by each such pixel may vary depending on the wavelength of light impacting it so that the array may thus reproduce a composite image of the object 213. In one embodiment, the first, second, and third image sensors 120, 121, 122 may have substantially identical pixel array configurations. For example, the first, second, and third image sensors 120, 121, 122 may have the same number of pixels, the same pixel aspect ratio, the same arrangement of pixels, and/or the same size of pixels. However, in other embodiments, the first, second, and third image sensors 120, 121, 122 may have different numbers of pixels, pixel sizes, and/or layouts. For example, in one embodiment, the first and third image sensors 120, 122 of the two chrominance sensors 140, 142 may have a smaller number of pixels than the second image sensor 121 of the luminance sensor 141, or vice versa, or the arrangement of pixels may be different between the sensors.

As alluded to above, the first and third filters 115, 117 may overlay the first and third image sensors 120, 122 and allow the image sensors to capture the chrominance portions of a sensed image, such as chrominance images 125a and 125c. Similarly, the second filter 116 may overlay the second image sensor 121 and allow the image sensor 121 to capture the luminance portion of a sensed image as a luminance image 125b. The luminance image 125b, along with the chrominance images 125a and 125c, may be transmitted to the image processing module 110. As will be further described below, the image processing module 110 may combine the luminance image 125b captured by and transmitted from the luminance sensor 141 with the chrominance images 125a, 125c captured by and transmitted from the chrominance sensors 140, 142, to output a composite image 213.

In one embodiment, the luminance of an image may be expressed as a weighted sum of red, green and blue wavelengths of the image, in the following manner:

$$L = 0.59G + 0.3R + 0.11B$$

Where L is luminance, G is detected green light, R is detected red light, and B is detected blue light. The chrominance portion of an image may be the difference between the full color image and the luminance image. Accordingly, the full color image may be the chrominance portion of the image combined with the luminance portion of the image. The chrominance portion may be derived by mathematically processing the R, G, and B components of an image, and may be expressed as two signals or a two dimensional vector for each pixel of an image sensor. For example, the chrominance portion may be defined by two separate components Cr and Cb, where Cr may be proportional to detected red light less detected luminance, and where Cb may be proportional to detected blue light less detected luminance. In some embodiments, the first and second chrominance sensors 140, 142 may be configured to detect red and blue light and not green light, for example, by covering pixel elements of the first and third image sensors 120, 122 with a red and blue filter array. This may be done in a checkerboard pattern of red and blue filter portions. In other embodiments, the filters may include a Bayer-pattern filter array, which includes red, blue, and green filters. Alternatively, the filter may be a CYGM (cyan, yellow, green, magenta) or RGBE (red, green, blue, emerald) filter.

As discussed above, the luminance portion of a color image may have a greater influence on the overall color image resolution than the chrominance portions of a color image. In some embodiments, the luminance sensor 141 may be an image sensor 121 that has a higher pixel count than that of the chrominance sensors 140, 142. Accordingly, the luminance image 125b generated by the luminance sensor 141 may be a higher resolution image than the chrominance images 125a, 125b generated by the chrominance sensors 140, 142. In other embodiments, the luminance image 125b may be stored at a higher resolution or transmitted at higher bandwidth than the chrominance images 125a, 125c. In some embodiments, the chrominance images 125a, 125c may be bandwidth-reduced, subsampled, compressed, or otherwise treated separately to shorten the amount of time required for processing the chrominance images 125a, 125c and improve the overall efficiency or performance of the image sensing device 100.

The ability to control the luminance sensor 141 separately from the chrominance sensors 140, 142 can extend the performance of image sensing device 100 in a variety of ways. According to some embodiments, the chrominance sensors 140,142 may be configured to generate chrominance images 125a, 125b as lower resolution images without producing human-perceptible degradation of the composite image 213, particularly if the composite image 213 is compressed (e.g., using JPEG compression). In another embodiment, the chrominance sensors 140, 142 may use a larger lens aperture or a lower frame rate than the luminance sensor 121, which may improve operation at lower light levels (e.g., at lower intensity levels of incoming light 101). In other embodiments, the chrominance sensors 140, 142 may use shorter exposure times to reduce motion blur.

In some embodiments, the luminance sensors 141 may lack any filter 116 or may use a filter that has increased optical transmission, as compared to that of the color filters 115, 117. Those skilled in the art will appreciate that an image sensor without a filter or using a filter having an increased optical transmission may detect substantially the full intensity of incoming light and allow for smaller pixels while absorbing the same number of photons per second. This may permit the image sensors 121 to have a higher sampling rate, improved light efficiency, and/or sensitivity. For example, the luminance sensor 141 may be configured to sense light at any wavelength and at substantially all pixel locations. In other embodiments, the luminance sensor 141 may include a filter 116 that attenuates light as necessary to produce a response from the sensor that matches the response of the human eye. For example, in one embodiment, the filter 116 may produce a weighting function that mimics the response of the human eye.

The increased sensitivity of the luminance sensor 141 afforded by sensing the full or substantially full luminance of an image may be used in various ways to extend the performance of image sensing device 100 and its composite image 213. For example, an image sensor with relatively small pixels may be configured to average the frames or operate at higher frame rates. Additionally, noise levels may be reduced by using less analog and/or digital gain to improve image compression and image resolution. Smaller lens apertures may be used to increase depth of field. Images may be captured in darker ambient lighting conditions.

In some embodiments, the fields of view of any two of the luminance and chrominance sensors 140, 141, 142 may be offset so that the produced images 125a, 125b, 125c are slightly different. As discussed above, the image processing module 110 may combine the high resolution luminance image 125b captured by and transmitted from luminance sensor 141 with the first and second chrominance images 125a, 125c captured by and transmitted from the first and second chrominance sensors 140, 142, to output a composite image 213. As will be further discussed below, the image processing module 110 may use a variety of techniques to account for differences between the high-resolution luminance image 125b and first and second chrominance images 140, 142 to form the composite image 213.

In one embodiment, the first and second chrominance sensors 140, 142 may be offset from one another and the image processing module 110 may be configured to compensate for differences between the images 125a, 125c captured by the sensors. In some embodiments, this may be accomplished by comparing the first chrominance image 125a with the second chrominance image 125c to form a stereo disparity map between the two chrominance images 125a, 125c. The stereo disparity map may be a depth map in which depth information for objects in the images is derived from the offset first and second chrominance images 125a, 125c. This information may be used to estimate approximate distances between objects in the image, which in turn may be used to substantially align the first and second chrominance images 125a, 125c. In some embodiments, the image processing module 110 may further compare the luminance image 125b with one or both of the chrominance images 125a, 125c to form further stereo disparity maps between the luminance image 125b and the chrominance images 125a, 125c. Alternatively, the image processing module 110 may be configured to refine the accuracy of the stereo disparity map generated initially using only the two chrominance sensors. In one embodiment of this three-sensor approach, the chrominance sensors may be full Bayer array sensors.

According to some embodiments, image processing module 110 may use the stereo disparity map(s) to generate a deliberate geometric distortion of at least one of the first and second chrominance images 125a, 125c, such as to compensate for depth of field effects or stereo effects. Some images captured by the image sensing device 100 may have many simultaneous objects of interest at a variety of working distances from lens assembly 202. Alignment of first and second chrominance images 125a, 125c may therefore include warping of one image using a particular warping function to match the other image if alignment is desired. For example, the warping function may be derived using the first and second chrominance images 125a, 125c, which may be substantially identical images except for depth of field effects and stereo effects. In one embodiment, the algorithm for determining the warping function may be based on finding fiducials in the first and second chrominance images 125a, 125c and then determining the distance between fiducials in the pixel array. Once the warping function has been determined, first chrominance image 126a may be "warped" and combined with the second chrominance image 126b. In some embodiments, the first and second chrominance images 125a, 125c may further be "warped" and combined with the luminance image 125b to form a composite image 213. In other embodiments, the image processing module 110 may be configured to align the images 125a, 125b, 125c by selectively cropping at least one of these images by identifying fiducials in the fields of view of the first and second chrominance images 125a, 125c or by using calibration data for the image processing module 210. In yet another embodiment, the two chrominance images 125a, 125c may be combined so that the apparent field of view of the combined chrominance image is the same as the field of view of the luminance sensor.

Figure 3:
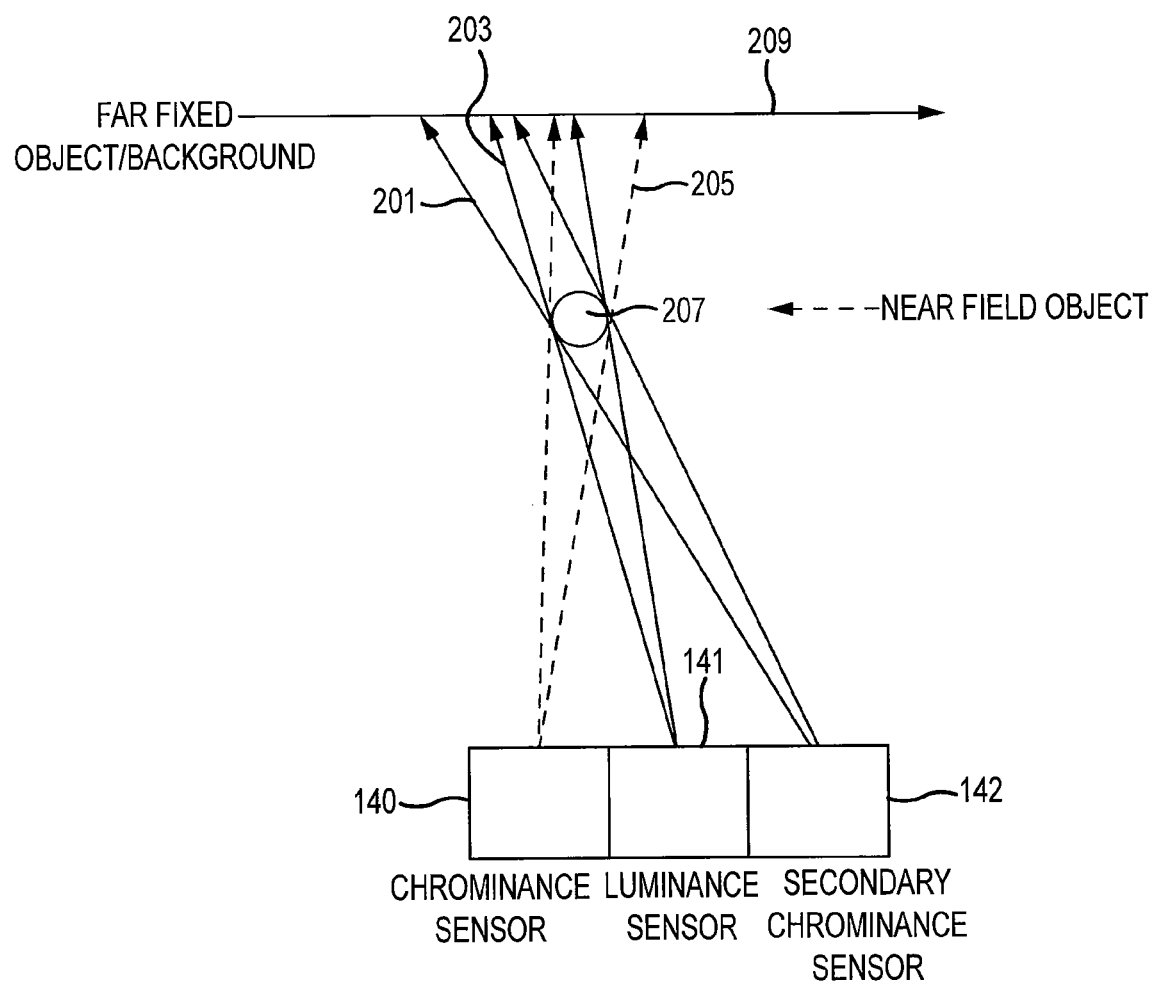
FIG. 3 illustrates the blind regions corresponding to the embodiment of the image sensing device shown in FIG. 2 due to a near field object.

FIG. 3 illustrates the blind regions corresponding to the embodiment of the image sensing device shown in FIG. 2 due to a near field object. As shown in FIG. 3, the fields of view of the first and second chrominance sensors 140, 142 can be offset so that the first and second chrominance images 125a, 125c are different. For example, the fields of view of the first and second chrominance sensors 140, 142 can be horizontally or vertically offset. In other embodiments, the fields of view of the first and second chrominance sensors can be diagonally or otherwise offset. Once offset, the fields of view of the first and second chrominance sensors 140, 142 may only partially overlap. In other embodiments, the fields of view of the first and second chrominance sensors 140, 142 may fully overlap.

The field of view of the luminance sensor 141 can also be horizontally, vertically, diagonally, or otherwise offset from that of the first and second chrominance sensors 140, 142. In one embodiment, the field of view of the luminance sensor 141 may be offset from that of the first and second chrominance sensors 140, 142 such that the field of view of the first chrominance sensor 140 may only partially overlap with the field of view of the luminance sensor 141 and the field of view of the second chrominance sensor 142 may only partially overlap with the field of view of the luminance sensor 141. In other embodiments, the fields of view of the first and second chrominance sensors 140, 142 and the luminance sensor 141 may fully overlap.

Each of the luminance and chrominance sensors 140, 141, 142 can have a blind region 201, 203, 205 due to a near field object 207 that may partially or fully obstruct the fields of view of the sensors. For example, the near field object 207 may block the field of view of the sensors 140, 141, 142 to prevent the sensors 140, 141, 142 from detecting part or all of a background or a far field object 209 that is positioned further from the sensors 140, 141, 142 than the near-field object.

In one embodiment, the chrominance sensors 140, 142 may be positioned such that the blind regions 201, 205 of the chrominance sensors 140, 142 do not overlap. Accordingly, chrominance information that is missing from one of the chrominance sensors 140, 142 due to a near field object 207 may, in many cases, be captured by the other chrominance sensor 140, 142 of the image sensing device. The captured color information may then be combined with the luminance information from the luminance sensor 141 and incorporated into the final image, as previously described. Due to the offset blind regions of the chrominance sensors, stereo imaging artifacts may be reduced in the final image by ensuring that color information is supplied by at least one of the chrominance sensors 140, 142 where needed. In other words, color information for each of the pixels of the luminance sensor 141 may be supplied by at least one of the chrominance sensors 140, 142. A three-sensor image sensing device may thus be useful, for example, when an R-B filter array is used in conjunction with the chrominance sensors, and a luminance image from the luminance sensor may be required or helpful for calculating the chrominance components of an image.

The generation of multiple chrominance images 125a, 125c may produce more accurate stereo disparity maps, thus resulting in more accurate alignment of the luminance and chrominance images 125a, 125b, 125c that are combined to form the composite image 213. For example, many algorithms for generating stereo disparity maps use color to match points or features from one image with the same points or features in another image. Accordingly, the chrominance images produced by the first and second chrominance sensors 140 142 may allow for the generation of a more accurate stereo disparity map, as compared to image sensing devices that are only capable of generating a single chrominance image. Additionally, some embodiments may also compare the luminance image 125b produced by the luminance sensor 141 to each of the color images 125a, 125b produced by the chrominance sensors 140, 142 to generate additional disparity maps between the color images and the luminance image. This may further enhance the image sensing device's ability to accurately align the luminance and color images to form the composite image 213.

Other embodiments of image sensing devices may include other configurations of chrominance and luminance sensors. For example, in one embodiment, the luminance and chrominance sensors 140, 141, 142 may be positioned such that the blind regions 201, 203, 205 may be different for each of the luminance and chrominance sensors 140, 141, 142. In some embodiments, the blind regions 201, 203, 205 of the luminance and chrominance sensors may not overlap at all. In other embodiments, the blind regions of the chrominance sensors 140, 142 may partially or fully overlap one another.

Still with respect to FIG. 3, the luminance camera 141 may be positioned between the chrominance sensors 140, 142 so that the blind region 203 of the luminance sensor 141 may be between the blind regions 205, 201 of the first and second chrominance sensors 140, 142. This configuration may prevent or reduce overlap between the blind regions 205, 201 of the first and second chrominance sensors 140, 142, while also allowing for a more compact arrangement of sensors within the image sensing device. However, in other embodiments, the luminance camera 141 may be positioned adjacent one or both of the chrominance sensors 140, 142, rather than in-between the sensors.

Figure 4:
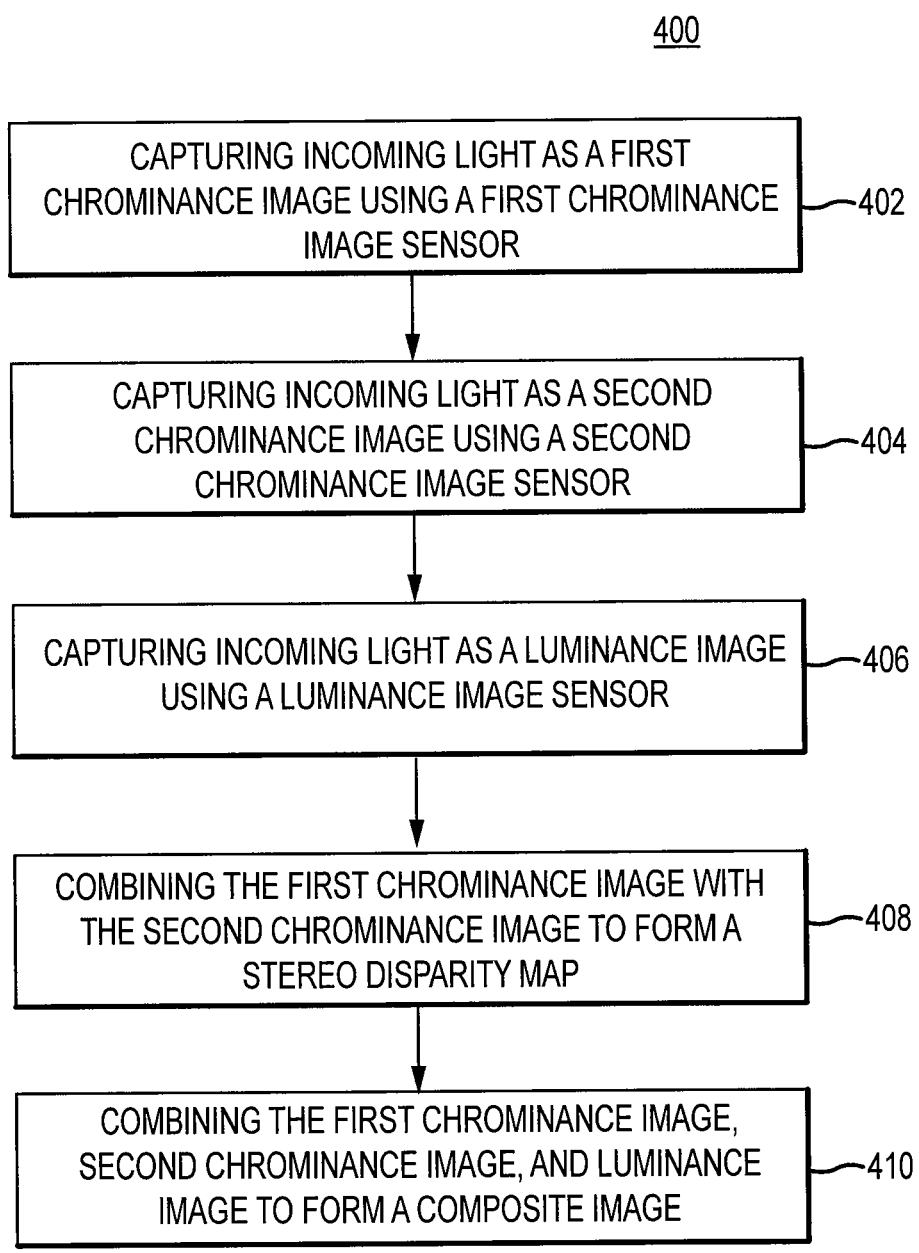
FIG. 4 is a flow diagram of a method for capturing an image using luminance and chrominance sensors.

FIG. 4 is a flow diagram of an exemplary method 400 for capturing an image using separate luminance and chrominance sensors according to some embodiments. In the operation of block 402, incoming light may be captured as a first chrominance image by a first chrominance image sensor. In one embodiment, the first chrominance image sensor may be configured to capture a low resolution image. The first chrominance image sensor may be configured to capture the chrominance and luminance portions of the incoming light. In the operation of block 404, incoming light may be captured as a second chrominance image by a second chrominance image sensor. In one embodiment, the second chrominance image sensor may be configured to capture a low resolution chrominance image. The first chrominance image sensor may be offset from the second chrominance image sensor so that the blind regions of the first and second chrominance image sensors do not overlap, or only partially overlap.

In the operation of block 406, incoming light may be captured as a luminance image by a luminance image sensor. In one embodiment, the luminance image may have a higher number of pixels or may be a higher resolution image than the chrominance images captured by the first and second chrominance image sensors. In the operation of block 408, the first chrominance image may be combined with the second chrominance image to form a stereo disparity map. In some embodiments, chrominance information from the first and second chrominance images may be used to identify the same point or pixel in both images. In the operation of block 410, the first chrominance image, second chrominance image, and luminance image may be combined to form a composite image. In some embodiments, combining the images may include substantially aligning the images using techniques such as geometric distortion and image cropping. For example, the luminance image may be compared to each of the first and second chrominance images to determine a proper warping function needed to properly combine the two images for forming the composite image.

The order of execution or performance of the methods illustrated and described herein is not essential, unless otherwise specified. That is, elements of the methods may be performed in any order, unless otherwise specified, and that the methods may include more or less elements than those disclosed herein. For example, it is contemplated that executing or performing a particular element before, contemporaneously with, or after another element are all possible sequences of execution.

What is claimed is:

1. An image sensing device comprising: a first image sensor for capturing a luminance image; a second image sensor for capturing a first chrominance image; a third image sensor for capturing a second chrominance image; and an image processing module for combining the luminance image, the first chrominance image, and the second chrominance image, to form a composite image; wherein the first image sensor is positioned between the second and third image sensors.

2. The image sensing device of claim 1, wherein the second image sensor captures a first field of view and the third image sensor captures a second field of view; and the first field of view is offset from the second field of view.

3. The image sensing device of claim 2, wherein the first image sensor captures a third field of view; and the third field of view is offset from the first and second field of views.

4. The image sensing device of claim 1, wherein the image processing module is configured to generate a stereo disparity map from the first and second chrominance images.

5. The image sensing device of claim 1, wherein the image processing module is configured to generate a first stereo disparity map from the first chrominance image and the luminance image and a second stereo disparity map from the second chrominance image and the luminance image.

6. The image sensing device of claim 1, wherein the second or third image sensor includes a pattern of red and blue filters.

7. The image sensing device of claim 1, wherein the second or third image sensor includes a Bayer-pattern filter.

8. A method for sensing an image, comprising: generating a luminance image with a first sensor; generating a first chrominance image with a second sensor; generating a second chrominance image with a third sensor, wherein the first sensor is positioned between the second and third sensors; generating a stereo disparity map from the first and second chrominance images, and based on the stereo disparity map, combining the luminance image with the first and second chrominance images to produce a composite image.

9. The method of claim 8, wherein the first sensor has a higher pixel count than the second sensor.

10. The method of claim 8, wherein the first sensor has a higher pixel count than the third sensor.

11. The method of claim 8, wherein the combining step comprises substantially aligning the first and second chrominance images with the luminance image.

12. The method of claim 11, wherein the substantially aligning comprises warping the first and second chrominance images.

13. An image sensing device, comprising: a first image sensor for capturing a luminance image, the first image sensor having a first blind region due to a near field object; a second image sensor for capturing a first chrominance image, the second image sensor having a second blind region due to the near field object; a third image sensor for capturing a second chrominance image, the third image sensor having a third blind region due to the near field object, wherein the first image sensor is positioned between the second and third image sensors; and an image processing module for combining the luminance image captured by the first image sensor, the first chrominance image, and the second chrominance image, to form a composite image, wherein forming the composite image includes supplementing the first chrominance image with chrominance information from the second chrominance image in portions of the first chrominance image that lack chrominance information due to the second blind region; wherein the second blind region of the second image sensor is offset from the third blind region of the third image sensor.

14. The image sensing device of claim 13, wherein the first image sensor is positioned between the second and third image sensors.

15. The image sensing device of claim 13, wherein the second blind region does not overlap with the third blind region.

16. The image sensing device of claim 13, wherein the first blind region is offset from at least one of the first and second blind regions.

17. The image sensing device of claim 16, wherein the first image sensor is a higher resolution sensor than the second image sensor.

18. A method for sensing an image, comprising: generating a luminance image with a first sensor; generating a first chrominance image with a second sensor; generating a second chrominance image with a third sensor, wherein the first sensor is positioned between the second and third sensors; generating a first stereo disparity map from the first chrominance image and the luminance image.

* * * * *